United States Patent
Dodson

(10) Patent No.: US 8,543,689 B2
(45) Date of Patent: Sep. 24, 2013

(54) APPARATUS AND METHOD FOR ANALYSING A COMPUTER INFRASTRUCTURE

(75) Inventor: Stephen Dodson, London (GB)

(73) Assignee: Prelert Ltd., Uxbridge Middlesex (GB)

( * ) Notice: Subject to any disclaimer, the term of this patent is extended or adjusted under 35 U.S.C. 154(b) by 342 days.

(21) Appl. No.: 12/965,226

(22) Filed: Dec. 10, 2010

(65) Prior Publication Data

US 2011/0145400 A1    Jun. 16, 2011

Related U.S. Application Data

(60) Provisional application No. 61/285,465, filed on Dec. 10, 2009.

(51) Int. Cl.
*G06F 15/173* (2006.01)

(52) U.S. Cl.
USPC ............ 709/224; 709/204; 709/205; 709/223

(58) Field of Classification Search
USPC .................................. 709/204–207, 223–224
See application file for complete search history.

(56) References Cited

U.S. PATENT DOCUMENTS

| | | | |
|---|---|---|---|
| 5,511,164 A * | 4/1996 | Brunmeier et al. | 714/53 |
| 5,905,892 A * | 5/1999 | Nielsen et al. | 717/145 |
| 6,012,152 A | 1/2000 | Douik et al. | |
| 6,820,251 B1 * | 11/2004 | Dwyer | 717/130 |
| 7,200,773 B2 * | 4/2007 | Luick | 714/25 |
| 7,280,988 B2 | 10/2007 | Helsper et al. | |
| 7,309,833 B2 * | 12/2007 | Robeson et al. | 136/263 |
| 7,451,210 B2 | 11/2008 | Gupta et al. | |
| 8,015,279 B2 * | 9/2011 | Christodoulou et al. | 709/224 |
| 2005/0080806 A1 | 4/2005 | Doganata et al. | |
| 2006/0020924 A1 | 1/2006 | Lo et al. | |
| 2006/0190583 A1 * | 8/2006 | Whalen | 709/223 |
| 2007/0277152 A1 * | 11/2007 | Srinivasan | 709/230 |
| 2009/0049335 A1 | 2/2009 | Khatri et al. | |
| 2009/0177692 A1 | 7/2009 | Chagoly et al. | |
| 2012/0296974 A1 * | 11/2012 | Tabe | 709/204 |

* cited by examiner

*Primary Examiner* — Bharat N Barot
(74) *Attorney, Agent, or Firm* — 24IP Law Group; Timothy R. DeWitt

(57) ABSTRACT

A system and method for analyzing a computer infrastructure. The system and method analyses messages sent and received within the computer infrastructure to determine a system model and exception data.

7 Claims, 4 Drawing Sheets

APPARATUS AND METHOD FOR ANALYSING A COMPUTER INFRASTRUCTURE

CROSS REFERENCE TO RELATED APPLICATIONS

This application claims the benefit of and priority to, under 35 U.S.C. §119(e) and any other United States or other law, the following: U.S. Ser. No. 61/285,465 filed 10 Dec. 2009, entitled APPARATUS AND METHOD FOR MONITORING A COMPUTER NETWORK, the entire disclosure of which is incorporated herein by reference in its entirety for all purposes.

FIELD OF INVENTION

The field of the present invention relates to an apparatus and a method for analysing a computer infrastructure.

BACKGROUND OF INVENTION

FIG. 4 shows an example of an application error 400 that occurs in a computer infrastructure. It is known that the application error 400 may have a number of different causes 410 and 410' which are shown lead to different causality sequences 420 as shown in FIG. 4. It will be seen, for example, that by looking back in time it is at least theoretically possible to analyse the causation sequences 420 and identify the original cause 410 of the error, and eliminate other initial causes 410' for the application error. The extreme complexity of modern computer infrastructures makes, however, this analysis a time-consuming task. A network administrator may have to review a large number of entries in a systems log to exclude possible causes of error.

Apparatuses and methods for analysing a computer infrastructure to analyse such possible causes of errors are known in the art. In these prior art apparatuses and methods, a structure of the computer infrastructure needs to be analysed. The analysing system identifies different types of messages that are typically sent from devices, such as routers or peripheral devices, within the computer infrastructure. The analysing system allows the structure of the computer infrastructure to be identified, even if the infrastructure is highly complicated and changeable. The analysing system is suitable for distributed application architectures.

It is possible to use the information about the infrastructure obtained through the analysing system to identify a malfunction or an error within part of the computer infrastructure by analysing an error message error or the lack of an expected message. Sometimes the analysing system will enable a diagnosis or report of the possible source of the malfunction within the computer infrastructure to an administrator of the computer infrastructure. In other cases it is not possible or it is difficult to diagnose or identify the malfunction within the part of the computer infrastructure. The network administrator may need to physically send a person to investigate, diagnose or identify the malfunction within the part of the computer infrastructure. Some of the prior art systems may require a detailed knowledge of the structure of the computer infrastructure. In particular, the addition and/or removal of users and/or new peripheral devices to the computer infrastructure will require a reprogramming of the analysing system. The reprogramming of the analysing system may need to be carried out on a regular basis as users and/or new peripheral devices are added to the computer infrastructure. The reprogramming of the analysing system is time-consuming as well as being liable to error.

Many institutions (for example financial institutions) rely upon and use extensive computer infrastructures that receive, process and accumulate a large amount of time-critical data from external sources. Examples of the external sources include, but are not limited to, information from the Bloomberg and the Thomson Reuters information providers. This data from external sources is distributed to the users of the computer infrastructure. The distribution of the data to the users of the computer infrastructure results in a large amount of data traffic in the computer infrastructure. Effective data distribution within the computer infrastructure is often critical for the operation of the financial institution. If, for example, one of the routers within the computer infrastructure malfunctions or breaks down, it is possible that one or more of the users of the computer infrastructure would not receive the data at all, or one or more of the users of the computer infrastructure would not receive the data in a timely manner. The ineffective data distribution within the computer infrastructure may lead to erroneous investment decisions being made. There is therefore a need to provide a system that can analyse and monitor data distribution malfunctions within a computer infrastructure.

Several prior art documents are known which address similar problems within computer infrastructures.

U.S. Pat. No. 7,451,210 (IBM) discloses a method for predicting the occurrence of future critical events in a computer cluster having a series of nodes. The method records system performance parameters, such as temperature, central processing unit utilisation time, processor number, user time, idle time, and input/output time, at predetermined intervals of time. The method also records the occurrence of past critical events, such as hardware or software errors or node failures, in the computer cluster. Time-series models and rule-based classification schemes are used to associate various system performance parameters with the occurrence of critical events and fed into a Bayesian network to predict the occurrence of future critical events in the computer cluster.

U.S. Pat. No. 7,280,988 (Netuitive) teaches a monitoring system for a computer infrastructure. The monitoring system of the U.S. Pat. No. 7,280,988 includes a baseline model that automatically captures and models normal system behaviour of the computer infrastructure. The monitoring system further includes a correlation model that employs a multivariate auto regression analysis to detect abnormal system behaviour of the computer infrastructure, and an alarm service that processes and scores a variety of alerts to determine an alarm status and to implement appropriate response action for the computer infrastructure when a threshold value is reached. The baseline model decomposes input variables into a number of components representing relatively predictable behaviours so that the erratic component of the computer infrastructure may be isolated for further processing. Modelling and continually updating of the components of the computer infrastructure separately permits an accurate identification of the input variable, which typically reflects abnormal patterns when they occur.

The baseline model of the Netuitive monitoring system is updated on an on-going basis that allows the model to adapt to changes in the normal operational pattern of the computer infrastructure. The Netuitive monitoring system does not maintain a large database of historical analysis and does not enable a periodic revaluation of the historical data. The Netuitive monitoring system is able to establish abnormal patterns and is able to present a list of events related to the abnormal patterns.

US patent application US 2006/0020924 (Lu and Chang) discloses a system, a method and a computer program product for monitoring performance of groupings of a computer infrastructure and applications using statistical analysis. The method, system and computer program monitors managed unit groupings of executing software applications and execution infrastructure to detect deviations in performance of the computer infrastructure. Logic acquires time-serious data from at least one managed unit grouping of the executing software applications and the execution infrastructure. Other logic derives a statistical description of expected behaviour from an initial set of acquired data. The logic derives a statistical description of operating behaviour from the acquired data that corresponds to a defined moving window of time slots. The logic compares the statistical description of expected behaviour with the description of operating behaviour and the logic reports predictive triggers. The logic identifies instances in which the statistical description of the operating behaviour deviates from the statistical description of the operating behaviour of the computer infrastructure to indicate a statistically significant probability letting operating anomaly exist within the at least one managed unit grouping corresponding to the acquired time period data.

SUMMARY OF INVENTION

The present invention discloses an apparatus for analysing a computer infrastructure. The apparatus comprises a plurality of first devices connected to the computer infrastructure and generating a first plurality of messages. The plurality of first devices could be, but is not limited to, servers, routers, computer peripheral devices and user terminals. A plurality of second devices (which could equally be one of a server, a router, a peripheral device or a user terminal) is also connected to the computer infrastructure and generates a second plurality of messages. A data store is attached to the computer infrastructure and stores one or more data items relating to the operation of the computer infrastructure and an analytics engine in the computer infrastructure analyses the first plurality of messages and the second plurality of messages. The analytics engine correlates the one or more data items to produce a systems model of at least part of the computer infrastructure.

The systems model can be analysed in the event of an application error to determine which one of the causality of sequences lead to the application error and thus identify the initial cause of the error.

The present disclosure further discloses a method for producing an analysis of the computer infrastructure. The method comprises collecting a plurality of messages, which relate to the operation of the computer infrastructure, to generate a system model and producing an exception data on the detection of abnormal sequences The present disclosure has the advantage that it shows rapidly exceptions or application errors in the computer infrastructure to allow rapid diagnosis. The teachings of the present disclosure allow the monitoring of a computer infrastructure for malfunctions within the computer infrastructure to be identified without the need for periodic and frequent programming of a structure of the computer infrastructure—or expensive and time consuming manual mining of data about the pluralities of messages.

DETAILED DESCRIPTION OF INVENTION

For a complete understanding of the present invention and the advantages thereof, reference is made to the following detailed description taken in conjunction with the accompanying figures.

It should be appreciated that the various aspects and embodiments of the present invention disclosed herein are merely illustrative of specific ways to make and use the invention and do not therefore limit the scope of the invention when taken into consideration with the appended claims and the following detailed description and the accompanying figures.

Figure 1:
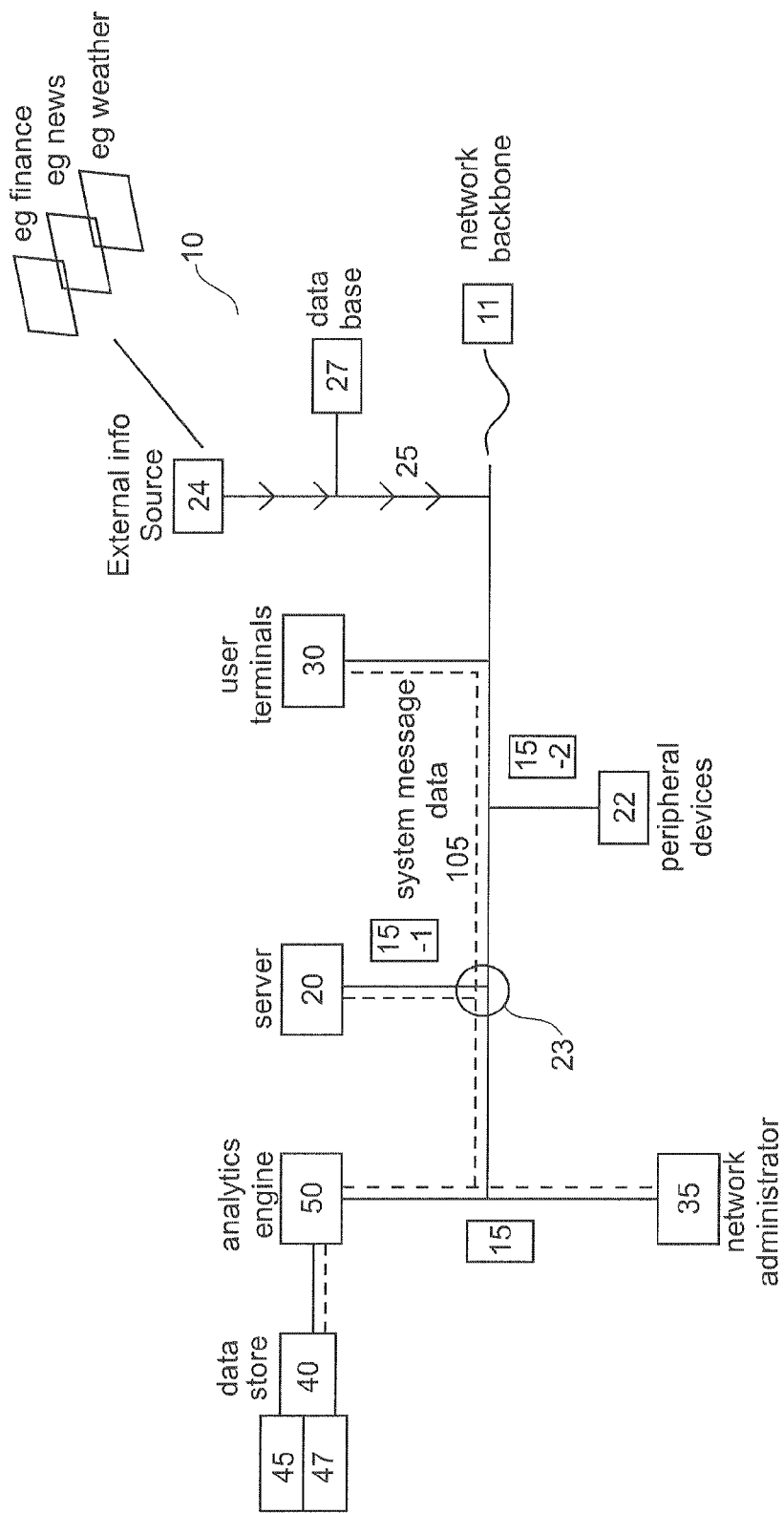
FIG. 1 shows an overview of a computer infrastructure according to the present invention.

FIG. 1 shows a computer infrastructure 10 according to an aspect of the invention. The computer infrastructure 10 comprises a backbone 11 to which servers 20, peripheral devices 22, and user terminals 30 are connected. The backbone 11 has a number of routers 23 connected to the backbone 11. Only one of the routers 23 is shown in FIG. 1. It will, however, be appreciated that the user terminals 30, servers 20 and the peripheral devices 22 will all be connected to the backbone 11 by means of one or more of the routers 23.

The computer infrastructure 10 is supplied with items of financial and news data 24 as an external data feed 25. The external data feed 25 could be, for example, the external data feed from a financial information supplier such as Reuters Thomson and/or Bloomberg. Other external data feeds 25 include news sources supplied by news agencies for example Reuters, DPA, AFP and other news agencies. The choice of the external data feed 25 is not limiting of the present invention. The data from the external data feed 25 is often stored intermediately on a database 27 that is connected to the backbone 11. Typically, there will be a number of different databases 27 connected to the backbone 11 which may store redundant copies of the financial and news data 24 from the external data feed 25 or may distribute the financial and news data 24 throughout the computer infrastructure 10. These redundant ones of the databases 27 are not shown in FIG. 1.

A network administrator 35 is connected to the backbone 11. The network administrator 35 monitors the operation and status of the computer infrastructure 10. The network administrator 35 has access to a systems log file 37 which stores parameters relating to the operation of the computer infrastructure 10. Such parameters will include, but are not limited to, log messages, performance metrics, usage data, and status indications relating to a malfunction of any one of the user terminals 30, the servers 27, the peripheral devices 22, applications, and any other devices of the computer infrastructure 10.

In the aspect of the invention shown in FIG. 1, an analytics engine 50 is connected to the backbone 11. The analytics engine 50 is connected to a data store 40. The data store 40 stores a system model of the computer infrastructure 10. This system model has been built up by examining system data items 45 related to the operation of the computer infrastructure 10. These system data items 45 include, but are not limited to, messages sent during a period of time over the computer infrastructure 10 relating to the operation of the user terminals 30, servers 20, routers 23 and the peripheral devices 22. The data store 40 may maintain the system data items 45 or discard them after analysis to build up the systems model of the computer infrastructure 10.

The data store 40 also has further storage for substantially real time system data items 47. The substantially real time system data items 47 in one aspect of the invention include all of the messages 15 being passed over the computer infrastructure 10 and relating to the operation of the user terminals 30, servers 20, routers 23 and the peripheral devices 22. For example, the router 23 will have messages relating to the supply of system data and the operation of the server 20. Every time system data is sent from the server 20 to one of the user terminals 30, the messages 15 will be generated. These messages 15 are stored as the real time system data items 47 in the data store 40. The real time system data items 47 can be accessed by both the analytics engine 50 and the network administrator 35 to examine them as will be explained below.

The system data items 45 include, in this example of the invention, the messages 15 obtained from the computer infrastructure 10 in a previously predefined period of time. Typically, the data store 40 would store the messages 15 as the system data items 45 for the previous seven days. However, this time frame of seven days is not limiting of the invention. The main limitation is the storage requirements to store all of the historic system data items 45 over the pre-defined time period.

The analytics engine 50 has two functions. The first function is to analyse all of the historic system data items 45 to identify patterns within the historic system data items 45 and thus build up the system model. These historic patterns can be identified using mathematical techniques, such as Bayesian analysis or support vector machine analysis. A number of other mathematical techniques are known. The second function is to enable analysis of any malfunctions or application errors in the computer infrastructure 10.

Let us take an example for such mathematical techniques for building up the systems model. Suppose that some items of the financial and news data 24 are transferred from the database 27 to one of the user terminals 30 through one of the routers 23. The external database 27 will supply a DB_data_sent message to the analytics engine 50 and stored in the data store 40 stating that the items of the financial and news data 24 are being supplied to the backbone 11 of the computer infrastructure 10. The router 23 will supply messages 15 to the data store 40 stating that the router 23 has received the items of the financial and news data 24 (router_data_receive) and has passed the items of the financial and news data 24 out of the router 23 (router_dbata_sent). Two messages 15 will thereby be generated, i.e. router_data_receive and router_data_sent. The user terminal 30 will also produce a terminal_data_receive message 15 indicating that the computer terminal 30 has received the items of the financial and news data 24. It will be expected during a normal operation of the computer infrastructure 10 that the messages 15 from the data base 27 (DB_data_sent), the router 23 (router_data_receive; router_data_sent) and the user terminal 30 (terminal_data_receive) will be received in that order and at a certain time difference (typically in the order of milliseconds). The analytics engine 50 will analyse the sequence of these messages 15 as well as their temporal parameters (time differences). This sequence can be converted into a series of individual events which can be represented as a pattern:

. . . ABDABDABHHHFGFGFGDCDDABCDAW-BXCYAZBDDDDCDDD DDDABABABHHDDDDDDF-GFGFGDDDDDDABABDDDDDDABABABDDDD DDFGFGFGDDDD . . . . A similar pattern is shown as a unified data stream 320 on FIG. 3 and will be discussed later.

Figure 4:
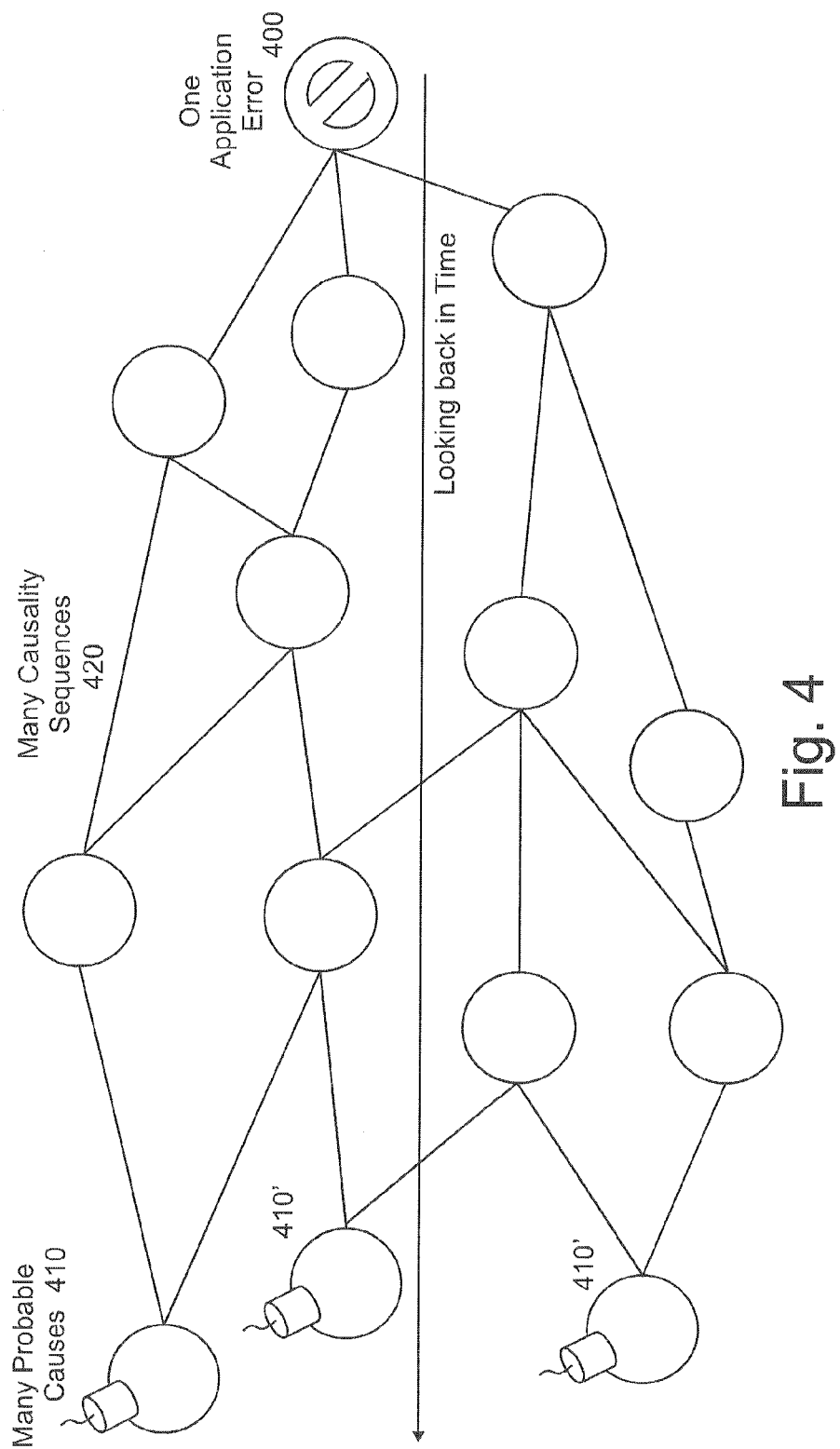
FIG. 4 shows a causality sequence from an initial cause to an application error.

This pattern is used to construct at least part of the system model. It will be appreciated that each one of the letters (A, B, etc) represents a different event that may represent performance data, usage data, data from log files, events from management systems. The analytics engine 50 is able to analyse a large amount of the events (such as the messages 15) and will note, for example, the sequence of occurrence of the events and a typical time between one of the events and another one of the events in order to see whether the events are correlated with each other, i.e. will fall within a particular time distribution. In general the analytics engine 50 can calculate the probability of each of the sequences occurring. This can be thought of as determining the causality sequences 420 of FIG. 4.

It will be appreciated that the addition of new user terminals 30 or peripheral devices 22 with the associated routers 23 will lead to new messages 15 being created. These new messages will be incorporated into the unified data stream 320 on a real-time dynamic basis. The network administrator 35 or other engineer does not need to "tell" the computer infrastructure 10 about the changes, the system model will identify the new sequences and record them I the data store 40.

Suppose now that an application error (or other malfunction) 400 occurs in the computer infrastructure 10 and, for example, one of the routers 23 fails. This could lead to one of the user terminals 30 connected to the router 23 becoming disconnected from the computer infrastructure 10 and business will be impacted. The items of the financial and news data 24 from the data base 27 to the user terminal 30 will have not arrived (in which case the user terminal 30 would not produce the corresponding terminal_data_receive message 15) or the items of the financial and news data 24 are rerouted through another path to reach the user terminal 30 (in which case it would be expected that the terminal_data_receive message 15 indicating the time taken for the receipt of the items of financial and news data 24 at the computer terminal 30 is much longer).

The pattern of the unified data stream 320 will show exceptions, as the expected pattern will not occur. Let us take the example of the above pattern and add exceptions:

. . . ABDABDABHHHFGFGFGDCDDABCDAW-BXCYAZBDDDDCDD DDDDABABABHHDDDDDDF-GFGFGDDDDDDABABDDDDDDABABABDDD DDDFGFGFGDDDD . . . .

These exceptions can be identified as a pattern and the user or the network administrator 35 can examine these exceptions to identify the cause 410 of the problem. In other words, the network administrator 35 could analyse this real time system data item 47 in comparison with the system model generated by the system data items 45 to identify the causality sequences 420 of FIG. 4. This comparison should enable diagnosis of the cause of the problem (i.e. in this case the failure of one of the routers 23).

The network administrator 35 can look at the exceptions to identify which of the causality paths 420 was followed to lead to the application error 400.

Figure 2:
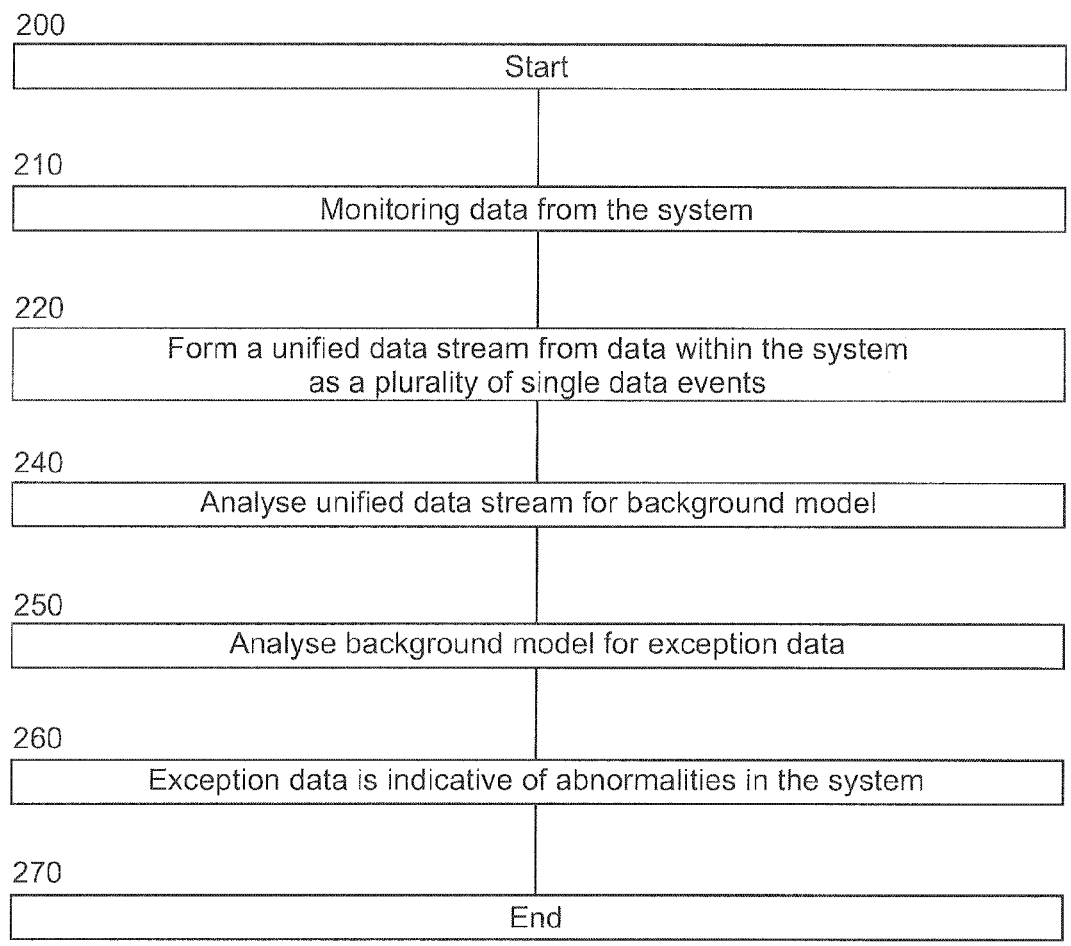
FIG. 2 shows an overview of a method for analysing an operation of the computer infrastructure according to the present invention.
Figure 3:
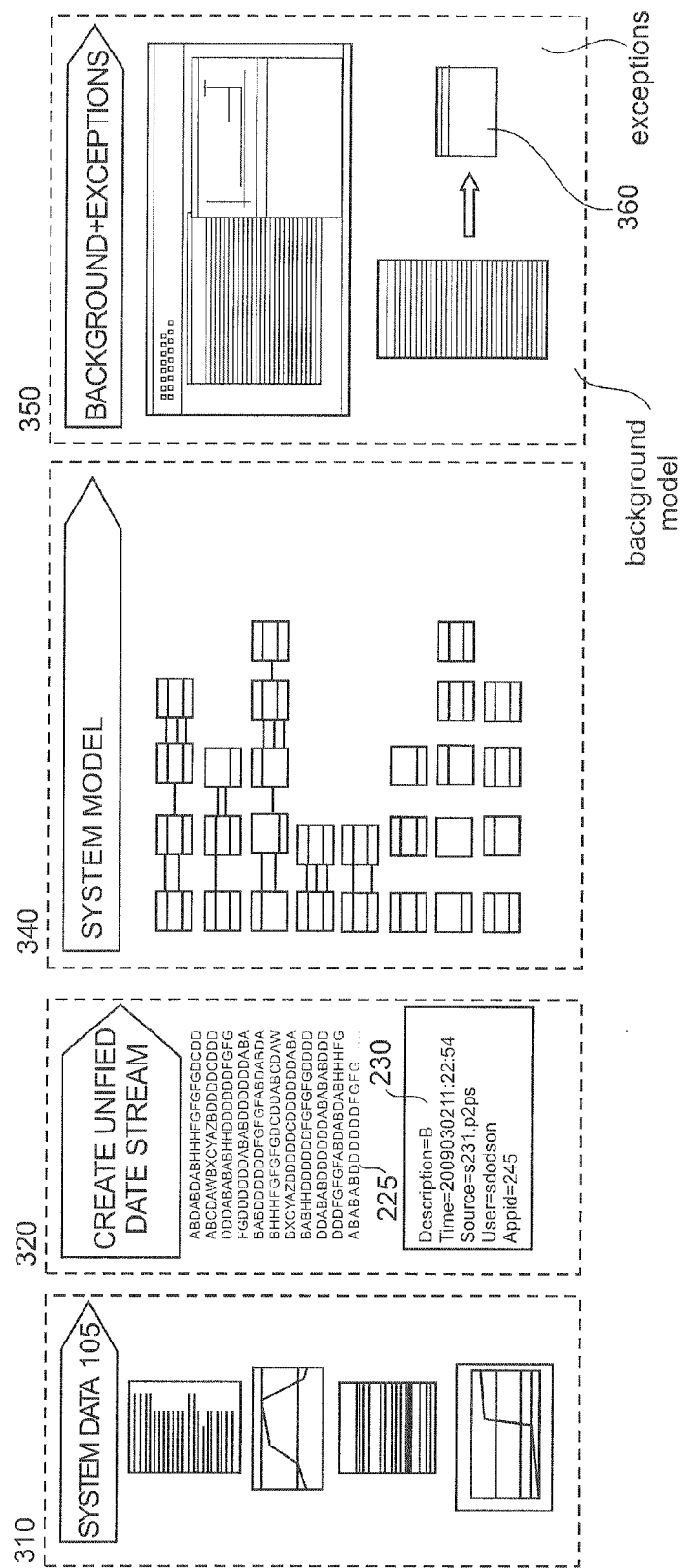
FIG. 3 shows an overview of the generation of the system model and the exception data.

FIGS. 2 and 3 show an example of the method for producing a system model in accordance with an aspect of the present invention.

The data from external services, such as the financial and news data 24 supplied by Thomson Reuters or Bloomberg, is input into the computer infrastructure 10 in step 210 as the data feed 25. The items of the financial and news data 24 from the external services can be retrieved or is pushed through to the user terminals 30. The items of the financial and news data 24 from the external services may be stored in the external services data base 27, if required and allowed under applicable law. The items of the financial and news data 24 from the external services can be pushed to the user terminals 30 using, for example, data feeds. The items of the financial and news data 24 from the external services can be retrieved from external websites or the database 27 using, for example, the http protocol. The items of the financial and news data 24 from external services can also be stored on other ones of the servers 20 as and when required.

The messages 15 relating to the operation of the computer infrastructure 10 are continually being generated as shown in 310 whilst the servers 20 and the user terminals 30 process the items of the financial and news data 24 from the external services. The messages 15 are also generated by the servers 20 and the user terminals 30, as well as the peripheral devices 22 and the routers 23 in the computer infrastructure 10. These messages 15 form a unified data stream in step 220 and shown as 320 in FIG. 3.

In step 340 the unified data stream 320 is analysed and the relationships between various messages 15 determined, as well as the probability of the relationship between the various messages 15 to develop the system model 340. Examples of the unified data stream 320 are given above as a string of letters. Let us suppose that a first message 15-1 (represented by one letter) generates after a particular time interval a second message 15-2 with a probability of 95%. This relationship between the generation of the first message 15-1 and the second message 15-2 is stored in the data store 40.

One example would be the receipt of the financial and news data 24 through the data feed 25. This would generate the first message 15-1 relating to the receipt of the financial and news data 24 (i.e. financial_data_receive). Note that the first message 15-1 will not be the financial and news data 24 itself, but a message indicating that one or more items of the financial and news data 24 has been received. Some of the items of the financial and news data 24 need to be passed to at least one or, more likely, a number of the user terminals 30 within a specified period of time. It is likely that the receipt of one or more of the items of the financial and news data 24 at the user terminals 30 will generate a number of individual messages 15 (such as terminal_data_receive or routing messages from routers). This relationship between the number of individual messages 15 can also be determined by the analysis of the historical system data item 45 and stored as the system model.

There are a number of methods for analysis of the messages 15 in the system items data 45 to build up the system model. These methods include, but are not limited to, Bayesian classification and clustering methods or support vector machine methods.

Suppose now that an application error 400 or malfunction occurs. The network administrator 35 can use the system model in the database 40 to identify the most likely causal sequence that lead to the error and thus diagnose the problem. Let us suppose that the first message 15-1 is generated from the user terminal 30. The system model 340 will indicate that within the defined time period the second message 15-2 should have been generated, as the system model 340 has indicated that this relationship between the first message 15-1 and the second message 15-2 generally happens. The system model 340 will note that there is a 95% chance of this second message 15-2 having been generated. In the event that no second message 15-2 is generated within the defined time period this will be noted and can be displayed as exception data 360. The network administrator 35 can then review the exception data 360 and compare these messages 15 related to the exception data 360 with the system model to identify the causality sequence 420 and thus diagnose a possible source 410. In this example it might be that one of the peripheral devices 22 was not operational because of lack of power or a broken connection or was otherwise overloaded.

A further example will illustrate further applications of the apparatus and method of this disclosure. Let us suppose that an application is running on the user terminals 30 but is failing at a fairly high rate and also that the CPUs (Central Processing Unit) are also running at a fairly high rate. At the same time an important market announcement is being made about financial markets and a number of users are running a same application on the user terminals 30. The network infrastructure 10 is determined to be highly loaded. The apparatus and method as taught in this disclosure will allow a diagnosis of the failure of the application on the user terminals 30 as follows.

The important market announcement generates the financial and news data 24 supplied to the system through the data feed 25. The supply of the items of the financial and news data 24 will generate a significant number of the messages 15 (as described above). Since this is an important market announcement it will be expected that a significant increase in the number of messages 15 will be generated as the items of the financial and news data 24 are fed into the systems and stored into the database 27 from the data feed 25. These items of financial and news data 24 will be received at the user terminal 30 and the users at the user terminal 30 will use the information from the items of financial and news data 24 to input data into the applications (including the failing application). This input of application data into the applications again results in further ones of the messages 15 being generated by the user terminals 30. The heavy usage of the CPUs in the user terminals 30 also results in different ones of the messages 15 being generated. Similar the transfer of the items of financial and news data 24 through the routers 23 and/or the servers 20 will result in further ones of the messages 15.

As described above the plurality of the messages 15 are received by the analytics engine 50 which is able to generate the unified data stream 320 from the plurality of the different ones of the messages 15 and is able to analyse the unified data stream of the different ones of the messages 15 with the system model in order to generate the exception data 360. The network administrator 35 can use the exception data 360 to diagnose for the overloading of the CPUs on the user terminals 30 as well as the failing of the application due to the increase of data through the routers 23.

The network administrator 35 is able to use the diagnosis and take appropriate action that may include the switching off of one or more of the (lesser important) peripheral devices 22 in order to reduce traffic on the network. The network administrator 35 could also close down non-critical applications running on one or more of the user terminals 30 in order to reduce the load on the network infrastructure 10.

The analysis by the analysis engine 50 will indicate that there is a probability after the receipt of a particular one of the messages 15 (or more normally a particular series of messages 15) that an error may occur within the computer infrastructure 10. The analytics engine 50 predicts this because the historic system data items 45 will group together all of the many messages 15 relating to particular jobs and procedures.

Thus, for example, if the analysis of the system data items 45 reveals that a series of four particular messages always occurs with a probability of 90%. The analytics engine 50 will then note that if the fourth one of the messages 15 is missing continuously, then a malfunctioning will have occurred within the computer infrastructure 10. The analytics engine 50 can alert the network administrator 35 to the possible malfunctioning or possible future malfunctioning within the computer infrastructure 10 and the network administrator 35 will be able to take appropriate action.

Having thus described the present invention in detail, it is to be understood that the foregoing detailed description of the invention is not intended to limit the scope of the invention. One of ordinary skill in the art would recognise other variants, modifications and alternatives in light of the foregoing discussion.

What is desired to be protected by letters patent is set forth in the following claims.

Reference numerals

10 Computer infrastructure
11 Network backbone
12 Systems log file
15 Message
20 Servers
22 Peripheral devices
23 Routers
24 Financial and news data
25 Data feed
27 Data base
30 User terminal
35 Network administrator
37 System log
40 Data store
45 Historic system data items
47 Real time system data items
50 Analytics engine

The invention claimed is:

1. A method for identifying a malfunction in operation of a computer infrastructure comprising:
   collecting a first plurality of messages relating to the operation of a plurality of first devices belonging to the computer infrastructure;
   collecting a second plurality of messages relating to the operation of a plurality of second devices belonging to the computer infrastructure;
   storing, in a data store, the first plurality of messages and the second plurality of messages in a predefined period of time to form an historic data items stored in the data store,
   correlating, by an analytics engine, the first plurality of messages and the second plurality of messages and producing a system model of at least part of the computer infrastructure, wherein the analytics engine (50) is adapted to identify expected patterns associated within the historic system data items to produce the system model,
   generating a unified data stream from a third plurality of messages relating to the operation of the computer infrastructure; and
   comparing the unified data stream with the system model to generate an exception data indicative of a malfunction.

2. An apparatus for identifying a malfunction in operation of a computer infrastructure comprising:
   a plurality of first devices belonging to the computer infrastructure and generating a first plurality of messages;
   a plurality of second devices belonging to the computer infrastructure and generating a second plurality of messages,
   a data store for storing the first plurality of messages and the second plurality of messages wherein the first plurality of messages and the second plurality of messages in a predefined period of time forms historic data items stored in the data store;
   and
   an analytics engine for correlating the first plurality of messages and the second plurality of messages and producing a system model of at least part of the computer infrastructure, wherein the analytics engine is adapted to identify expected patterns associated within the historic system data items to produce the system model and
   wherein the analytics engine is further adapted to generate a unified data stream from a third plurality of messages relating to the operation of the computer infrastructure and to compare the unified data stream with the system model to generate an exception data indicative of a malfunction.

3. The apparatus of claim 2, wherein the plurality of first devices is at least one of a server, a router, a peripheral device and a user terminal.

4. The apparatus of claim 2, wherein the plurality of first devices is at least one of a server, a router, a peripheral device and a user terminal.

5. The apparatus of claim 2, further comprising a plurality of third devices connected to the computer infrastructure and generating a third plurality of messages, wherein the plurality of third devices comprises at least one of a server, a router, a peripheral device and a user terminal and wherein the analytics engine is further adapted to analyze the messages from the plurality of third devices and correlating the messages from the plurality of third devices with the messages from at least one of the plurality of second devices and the plurality of first devices, thereby complementing the system model.

6. The apparatus of claim 2, further comprising an external data feed connected to the computer infrastructure.

7. A computer storage medium storing non-transitory computer-executable instructions for performing method for identifying a malfunction in operation of a computer infrastructure comprising:
   collecting a first plurality of messages relating to the operation of a plurality of first devices belonging to the computer infrastructure;
   collecting a second plurality of messages relating to the operation of a plurality of second devices belonging to the computer infrastructure;
   storing, in a data store, the first plurality of messages and the second plurality of messages in a predefined period of time to form an historic data items stored in the data store;
   correlating, by an analytics engine, the first plurality of messages and the second plurality of messages and producing a system model of at least part of the computer infrastructure, wherein the analytics engine is adapted to identify expected patterns associated within the historic system data items to produce the system model;
   generating a unified data stream from a third plurality of messages relating to the operation of the computer infrastructure; and
   comparing the unified data stream with the system model to generate an exception data indicative of a malfunction.

* * * * *